(12) United States Patent
Rubio Vidales et al.

(10) Patent No.: US 9,294,380 B2
(45) Date of Patent: Mar. 22, 2016

(54) METHOD AND APPARATUS FOR TRAFFIC CLASSIFICATION

(75) Inventors: Jose Rubio Vidales, Torrelodones (ES); Alfonso de Jesus Perez Martinez, Madrid (ES); Luis Campo Giralte, Madrid (ES); Rodrigo Alvarez Dominguez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 628 days.

(21) Appl. No.: 13/809,242

(22) PCT Filed: Jul. 9, 2010

(86) PCT No.: PCT/IB2010/053166
§ 371 (c)(1),
(2), (4) Date: Mar. 25, 2013

(87) PCT Pub. No.: WO2012/004634
PCT Pub. Date: Jan. 12, 2012

(65) Prior Publication Data
US 2013/0212265 A1    Aug. 15, 2013

(51) Int. Cl.
*G06F 15/173* (2006.01)
*H04L 12/26* (2006.01)
(Continued)

(52) U.S. Cl.
CPC ............... *H04L 43/10* (2013.01); *H04L 12/14* (2013.01); *H04L 12/1403* (2013.01);
(Continued)

(58) Field of Classification Search
None
See application file for complete search history.

(56) References Cited

U.S. PATENT DOCUMENTS

2003/0231625 A1* 12/2003 Calvignac ............. H04L 49/602
370/389
2007/0127448 A1* 6/2007 Buntin ................ H04L 12/6418
370/356
2008/0046963 A1* 2/2008 Grayson ................ H04L 12/66
726/1

(Continued)

FOREIGN PATENT DOCUMENTS

EP          2 146 458      1/2010
HU    WO 2007082587 A1 *  7/2007 .......... H04L 41/0893

OTHER PUBLICATIONS

International Search Report for PCT/IB2010/053166, mailed May 17, 2011.

(Continued)

*Primary Examiner* — Joshua Joo
*Assistant Examiner* — Younes Naji
(74) *Attorney, Agent, or Firm* — Baker Botts, LLP

(57) ABSTRACT

A Policy and Charging Rules Function server (PCRF) of a Policy and Charging Control (PCC) Architecture for deciding control rules applicable to user traffic flows to be inspected, in accordance with applicable telecommunication protocols for each traffic flow, by a Policy and Charging Enforcement Function server with Deep Packet inspection capabilities (PCEF-DPI) of the PCC Architecture. The PCRF includes a database having a list of protocols used in the user tialYtc flow s The PCRF includes an interface unit which receives a query from the PCEF-DPI about applicable control rules for an IP Connectivity Access Network (IP-CAN) session established for a user at the PCEF-DPI The PCRF includes a processing unit which sends the applicable control rules for the IP-CAN session and the list of protocols through the interface unit to the PCEF-DPI. A Policy and Charging Enforcement Function, server having Deep Packet Inspection capabilities (PCEF-DPI) of a Policy and Charging Control (PCC) Architecture. A method of a Policy and Charging Rules Function server (PCRF) of a Policy and Charging Control (PCC) Architecture. A method of a Policy and Charging Enforcement Function server having Deep Packet inspection capabilities (PCFF-DPI) of a Policy and Charging Control (PCC) Architecture.

19 Claims, 6 Drawing Sheets

(51) Int. Cl.
*H04L 12/14* (2006.01)
*H04M 15/00* (2006.01)
*H04L 29/06* (2006.01)

(52) U.S. Cl.
CPC ......... *H04L 12/2694* (2013.01); *H04L 43/028* (2013.01); *H04L 65/1016* (2013.01); *H04M 15/66* (2013.01); *H04L 43/18* (2013.01); *H04M 2215/204* (2013.01)

(56) References Cited

U.S. PATENT DOCUMENTS

2010/0142373 A1* 6/2010 Jin .......................... H04L 12/14
370/230

OTHER PUBLICATIONS

"3rd Generation Partnership Project; Technical Specification Group Services and System Aspects; Study on Policy Solutions and Enhancements (Release 10)", 3GPP DRAFT, vol. SA WG5, No. Xiamen, (Mar. 11, 2010), p. 18.

Allot Communications et al., "General Definition of the TDF functionality; key issue 4", 3GPP DRAFT, vol. SA WG2, No. Kyoto, (May 4, 2010), p. 1.

ETSI TS 129 212 v9.2.0; Technical Specification; Universal Mobile Telecommunications System (UMTS); LTE; Policy and charging control over Gx reference point (3GPP TS 29.212 version 9.2.0 Release 9), Apr. 2010.

Chapter One: Deep Packet Inspection and its Predecessors by Christopher Parsons (Version 3.5), Feb. 6, 2012.

3GPP TS 23.203 v9.4.0; Technical Specification; 3rd Generation Partnership Project; Technical Specification Group Services and System Aspects; Policy and charging control architecture (Release 9), Mar. 2010.

Diameter Credit-Control Application by H. Hakala et al. (Network Working Group; Request for Comments: 4006; Category: Standards Track, Aug. 2005.

* cited by examiner

METHOD AND APPARATUS FOR TRAFFIC CLASSIFICATION

This application is the U.S. national phase of International Application No. PCT/IB2010/053166, filed 9 Jul. 2010, which designated the U.S., the entire contents of which is hereby incorporated herein by reference.

TECHNICAL FIELD

The present invention is related to a Policy and Charging Control (PCC) Architecture having a Policy and Charging Enforcement Function server with Deep Packet Inspection capabilities (PCEF-DPI) and a Policy and Charging Rules Function server (PCRF); where traffic flows are inspected in accordance with applicable telecommunication protocols for each traffic flow, and for installing control rules applicable to the user traffic flows upon establishment of an IP Connectivity Access Network (IP-CAN) session, (As used herein, references to the "present invention" or "invention" relate to exemplary embodiments and not necessarily to every embodiment encompassed by the appended claims.)

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The IP-CAN sits between RAN (Radio Access Network) and the CN (Core Network), connecting access-side signaling to the service controls in the core. PCC architecture could take decision according to the type of IP-CAN used. This scenario is depicted in FIG. 10 (please check 3GPP TS 23.203 V9.4. FIG. 5.1.1).

FIG. 10 shows a policy and charging control architecture.
  PCRF (Policy and Charging Rules Function) is a functional element that performs policy control decision and flow based charging control. The PCRF provides network control regarding the service data flow detection, gating, QoS and flow based charging (except credit management) towards the PCEF.
  PCEF (Policy Control Enforcement Function) encompasses service data flow detection, policy enforcement and flow based charging functionalities, DPI (Deep Packet Inspection), embedded in PCEF, technology supports packet inspection and service classification, which consists on IP packets classified according to a configured tree of rules so that they are assigned to a particular service session.
  The Gx reference point is defined in 3GPP TS 29.212 and ties between the Policy and Charging Rule Function (PCRF) and the Policy and Charging Enforcement Function (PCEF).
  DPI technology offers two types of analysis:
  Shallow packet inspection: extracts basic protocol information such as IP addresses source, destination) and other low-level connection states. This information typically resides in the packet header itself and consequently reveals the principal communication intent.
  Deep Packet Inspection (DPI): provides application awareness. This is achieved by analyzing the content in both the packet header and the payload over a series of packet transactions. There are several possible methods of analysis used to identify and classify applications and protocols that are grouped into signatures. One of them is heuristic signatures which it is related with the behavioral analysis of the user traffic.

In regard to problems with existing solutions, although a heuristic analysis is developed with the intention to uniquely and completely identify its related application or protocol, there are some cases in which the signature is not robust (weak signature) and classification problems arise. Each time a user is connected to the network and generates traffic, PCEF with deep packet inspection tries to analyze each packet and inspect searching for each possible protocol. It has the following drawbacks:
  Number of new protocols and applications increases every year, consequently the current detection protocol mechanisms should change according to the state of the art of the internet protocols in a dynamic way.
  The probability of incorrect protocol detection increases as a consequence of the new protocols and applications increment every year.
  Real time protocol or applications are slowed because Deep packet inspection has to be done and the DPI functionality is CPU intensive.

SUMMARY

The present invention pertains to a PCRF of a PCC Architecture for deciding control rules applicable to user traffic flows to be inspected, in accordance with applicable telecommunication protocols for each traffic flow, by a PCEF-DPI of the PCC Architecture. The PCRF comprises a database having a list of protocols used in the user traffic flows. The PCRF comprises an interface unit which receives a query from the PCEF-DPI about applicable control rules for an IP-CAN session established for a user at the PCEF-DPI. The PCRF comprises a processing unit which sends the applicable control rules for the IP-CAN session and the list of protocols through the interface unit to the PCEF-DPI.

The present invention pertains to a PCEF-DPI of a PCC Architecture for inspecting user traffic flows in accordance with applicable telecommunication protocols for each traffic flow, and for installing control rules applicable to the user traffic flows, control rules received from a PCRF of the PCC Architecture. The PCEF-DPI comprises a processing unit which establishes an IP-CAN session for a user, and which is arranged for classifying IP packets in each user traffic flow according to configured protocol rules and for assigning the IP packets to particular service sessions. The PCEF-DPI comprises an interface unit from which a query is sent to the PCRF about applicable control rules for the IP-CAN session, and which receives from the PCRF the applicable control rules for the IP-CAN session along with a list of protocols. The PCEF-DPI comprises a DPI device for inspecting user traffic flows in accordance with applicable telecommunication protocols for each traffic flow by trying first with those protocols in the list of protocols received from the PCRF.

The present invention pertains to a method of a PCRF of a PCC Architecture for deciding control rules applicable to user traffic flows, to be inspected in accordance with applicable telecommunication protocols for each traffic flow, by a PCEF-DPI of the PCC Architecture. The method comprises the steps of receiving a query at an interface unit of the PCRF from the PCEF-DPI about applicable control rules for an IP-CAN session established for a user at the PCEF-DPI. There is the step of sending by a processing unit of the PCRF the applicable control rules for the IP-CAN session and a list of protocols used in the user traffic flows, which have been stored in a database, through the interface unit to the PCEF-DPI.

The present invention pertains to a method of a PCEF-DPI of a PCC Architecture for inspecting user traffic flows in accordance with applicable telecommunication protocols for each traffic flow, and for installing control rules applicable to the user traffic flows, control rules received from a PCRF of the PCC Architecture. The method comprises the steps of establishing with a processing unit of the PCEF-DPI an IP-CAN session for to user. There is the step of sending from an interface unit of the PCEF-DPI a query to the PCRF about applicable control rules for the IP-CAN session. There is the step of receiving at the interface unit from the PCRF the applicable control rules for the IP-CAN session along with a list of protocols. There is the step of inspecting with a DPI device user traffic flows in accordance with applicable telecommunication protocols for each traffic flow by trying, first with those protocols in the list of protocols received from the PCRF.

The present invention generally relates to packet inspection at a bearer layer; and, more particularly, to apparatus and method for inspecting user traffic flows to determine applicable telecommunication protocols for each traffic flow. PCC architecture includes a Policy and Charging Enforcement Function (PCEF) in charge of traffic flow detection, policing enforcement and charging based functionality. This PCEF enforces Quality of Service (QoS) and applicable policies to user traffic flow. In particular, the PCEF may be equipped with Deep Packet Inspection (DPI) capabilities for a deeper packet inspection and service classification, that is, classifying IP packets in the traffic flow according to configured rules and assigning the IP packets to particular service sessions. The PCC architecture also includes a Policy and Charging Rules Function (PCRF) in charge of providing network control for the traffic flow detection, policing enforcement decisions and charging decisions. To this end, the PCRF holds policies and provides PCC rules to the PCEF per user traffic flow basis for enforcement of QoS and policies.

When a user has established a connection with a network, a PCEF with DPI capabilities can start inspection and analysis of IP packets in the traffic flow by searching for each possible protocol that each IP packet might be based on. This search is thus carried out at any time the user is connected with the network and, at present, presents a number of drawbacks, which might be much worse in the future. In this respect and given that new protocols, new protocol versions and new applications continuously turn up, current protocol detection mechanisms must continuously be changed accordingly with emerging state of an and in a dynamic way. In this situation, the probability of incorrect protocol detections might increase. Moreover, the PCEF with DPI capabilities cannot take advantage from same actions to be carried out when analyzing different protocols which share some commonalities. There is thus a need for an optimization of packet inspection and protocol detection mechanisms to better face a future with large number of protocols, applications and respective versions thereof.

To overcome these problems, or at least to mitigate them, the present invention provides for a new PCRF, a new PCEF with DPI capabilities, and a new method of inspecting user traffic flows. The present invention thus provides for a method of inspecting user traffic flows to determine applicable telecommunication protocols for each traffic flow, the method comprising the steps of:

establishing a first IP-CAN session for a user at a PCEF with DPI capabilities (PCEF-DPI);

querying from the PCEF-DPI to a PCRF about applicable control rules for the first IP-CAN session;

sending from the PCRF towards the PCEF-DPI the applicable control rules for the IP-CAN session;

inspecting user traffic flows for the user at the PCEF-DPI to determine applicable telecommunication protocols for each traffic flow;

upon termination of the first IP-CAN session for the user, the PCEF-DPI indicating to the PCRF the termination of the first IP-CAN session for the user along with a list of protocols used in the user traffic flows during the first IP-CAN session;

storing at the PCRF the list of protocols used in the user traffic flows;

establishing a second IP-CAN session for the user at the PCEF-DPI;

querying from the PCEF-DPI to the PCRF about applicable control rules for the second IP-CAN session;

determining at the PCRF that the list of protocols used in the user traffic flows during the first IP-CAN session is available;

sending from the PCRF towards the PCEF-DPI the applicable control flues for the second IP-CAN session along with the list of protocols used in the user traffic flows during the first IP-CAN session; and inspecting user traffic flows for the user at the PCEF-DPI to determine applicable telecommunication protocols for each traffic flow by trying first with those protocols in the list of protocols received from the PCRF.

Advantageously, the method may also include a step of establishing a user session at both PCEF-DPI and PCRF upon establishment of the first. IP-CAN session, a step of closing the user session at both PCEF-DPI and PCRF upon termination of the first IP-CAN session, and a step of establishing a further user session at both PCEF-DPI and PCRF upon establishment of the second IP-CAN session.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
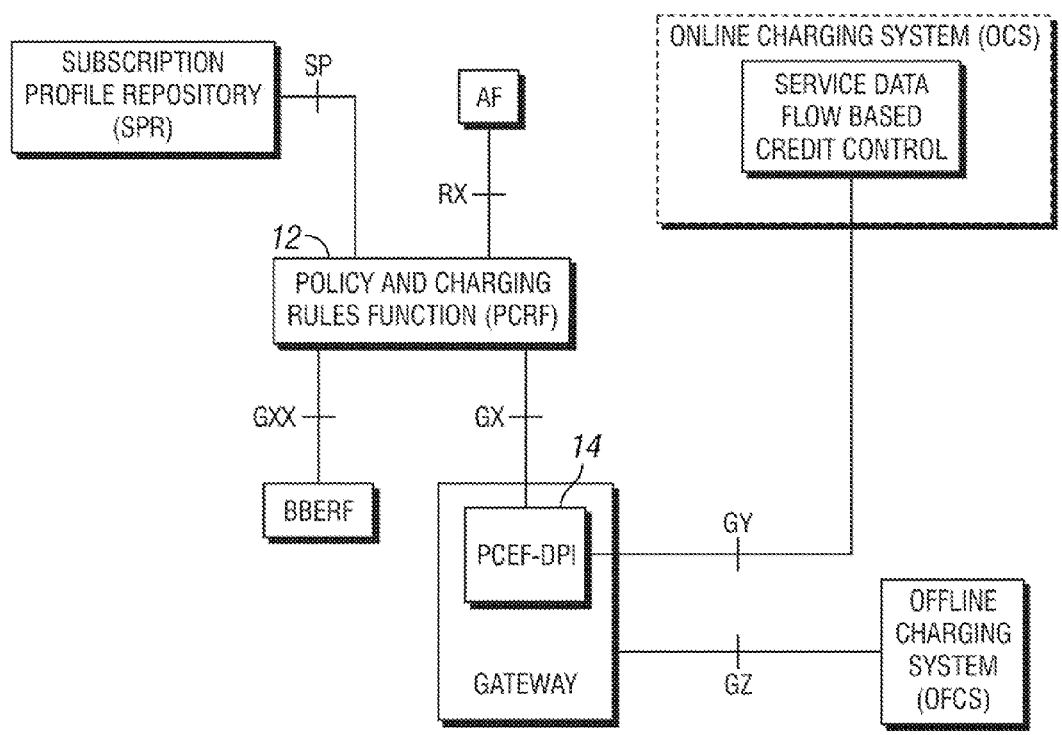
FIG. 1 shows a policy and charging control architecture of the present invention.

Referring now to the drawings wherein like reference numerals refer to similar or identical parts throughout the several views, and more specifically to FIGS. 1, 7, 8 and 9 thereof, there is shown a Policy and Charging Rules Function server (PCRF 12) of a Policy and Charging Control (PCC)

Architecture for deciding control rules applicable to user traffic flows to be inspected, in accordance with applicable telecommunication protocols for each traffic flow, by a Policy and Charging Enforcement Function server with Deep Packet inspection capabilities (PCEF-DPI 14) of the PCC Architecture. The PCRF P comprises a database 16 having a list, of protocols used in the user traffic flows. The PCRF 12 comprises an interface unit 18 which receives a query from the PCEF-DPI 14 about applicable control rules for an IP Connectivity Access Network (IP-CAN) session established for a user at the PCEF-DPI 14. The PCRF 12 comprises a processing unit 20 which sends the applicable control rules for the IP-CAN session and the list of protocols through the interface unit 18 to the PCEF-DPI 14.

The protocols in the list of protocols may have been used during previous IP-CAN sessions for the user at the PCEF-DPI 14. The processing unit 20 may determine that the list of protocols used in the user traffic, flows during the previous IP-CAN sessions for the user is available. The interface unit 18 may receive from the PCEF-DPI 14 the list of protocols used in the user traffic flows during the IP-CAN session for the user.

The processing unit 20 may store in the database 16 a Probable-Protocols AVP that includes a list of used traffic protocols in the user traffic flows during the previous IP-CAN sessions, the Probable-Protocols AVP used to carry the list of protocols. The processing unit 20 may store the list of used protocols for the user in the database 16 either per user, or as a global aggregate of all protocols in the PCEF-DPI 14 deployment, as an aggregate per user subscription type or user profile, or as an aggregate per node and group per day and time. Users who have not been updated in a predetermined period of time may be deleted. More specifically, the global aggregate may be a counter in the PCRF per specific protocol and accounting the traffic of each specific protocol for all the users; the aggregate per user may be a counter in the PCRF per user and accounting the traffic of each specific protocol for each particular user; and the aggregate per node, namely per PCEF-DPI, may be a counter in the PCRF per node and accounting, the traffic of each specific protocol for each particular node.

The present invention pertains to a PCEF-DPI 14 of a PCC Architecture for inspecting user traffic flows in accordance with applicable telecommunication protocols for each traffic flow, and for installing, control rules applicable to the user traffic flows, control rules received from a PCRF 12 of the PCC Architecture. The PCEF-DPI 14 comprises a processing unit 40 which establishes an IP-CAN session for a user, and which is arranged for classifying IP packets in each user traffic flow according to configured protocol rules and for assigning the IP packets to particular service sessions. The PCEF-DPI 14 comprises an interface unit 42 from which a query is sent to the PCRF 12 about applicable control rules for the IP-CAN session, and which receives from the PCRF 12 the applicable control rules for the IP-CAN session along with a list of protocols. The PCEF-DPI 14 comprises a DPI device 22 for inspecting user traffic flows in accordance with applicable telecommunication protocols for each traffic flow by trying first with those protocols in the list of protocols received from the PCRF 12.

Protocols in the list of protocols may have been used during previous IP-CAN sessions for the user. Upon termination of each IP-CAN session for the user in the processing unit 40, an indication may be sent to the PCRF 12 from the interface unit 42 indicating the termination of the IP-CAN session along with the list of protocols used in the user traffic flows during the IP-CAN session for the user. The DPI device 22 may classify the traffic sequentially or in parallel. See FIGS. 2-6.

The DPI device 22 may use a collection of rules for identifying a protocol to classify the traffic flow sequentially; and wherein the DPI device 22 searches sequentially a plurality of rule sets, each of which has a collection of rules, for a match of one of its rules with the traffic flow to classify the traffic flow with the rule which matches the traffic flow. The DPI device 22 may reorder the rule sets based on the list of protocols. See FIGS. 2-4.

The DPI device 22 may include a plurality of processing units 44, each of which executes in parallel on the traffic flow an algorithm different and independent from each other to identify a protocol to classify the traffic flow. Each of the processing units 44 may produce a result on the traffic flow and where results from the plurality of processing, units 44 of the DPI device 22 are different, the list of protocols received from the PCRF 12 are used to reconcile the results and identify a correct protocol for the traffic flow. See FIGS. 5 and 6.

The present invention pertains to a method of a PCRF 12 of a PCC Architecture for deciding control rules applicable to user traffic flows, to be inspected in accordance with applicable telecommunication protocols for each traffic flow, by a PCEF-DPI 14 of the PCC Architecture. The method comprises the steps of receiving a query at an interface unit 18 from the PCEF-DPI 14 about applicable control rules for an IP-CAN session established for a user at the PCEF-DPI 14. There is the step of sending by a processing unit 20 the applicable control rules for the IP-CAN session and a list of protocols used in the user traffic flows, which have been stored in a database 16, through the interface unit 18 to the PCEF-DPI 14.

There may be the step of adding in the list of protocols those protocols used during previous IP-CAN sessions for the user at the PCEF-DPI 14. There may be the step of the processing unit 20 determining that the list of protocols used in the user traffic flows during the previous IP-CAN sessions for the user is available. There may be the step of the interface unit 18 receiving from the PCEF-DPI 14 the list of protocols used in the user traffic flows during the IP-CAN session for the user.

The present invention pertains to a method of a PCEF-DPI 14 of a PCC Architecture for inspecting user traffic flows in accordance with applicable telecommunication protocols for each traffic flow, and for installing Control rules applicable to the user traffic flows, control rules received from a PCRF 12 of the PCC Architecture. The method comprises the steps of establishing with a processing unit 40 an IP-CAN session for a user, and which may be arranged for classifying IP packets in each user traffic flow according to configured protocol rules and for assigning the IP packets to particular service sessions. There is the step of sending from an interface unit 42 a query to the PCRF 12 about applicable control rules for the IP-CAN session. There is the step of receiving at the interface unit 42 from the PCRF 12 the applicable control rules for the IP-CAN session along with a list of protocols. There is the step of inspecting with a DPI device 22 user traffic flows in accordance with applicable telecommunication protocols for each traffic flow by trying first with those protocols in the list of protocols received from the PCRF 12.

Upon termination of each IP-CAN session for the user in the processing unit 40, there may be the step of sending an indication to the PCRF 12 from the interface unit 42 of the PCEF-DPI indicating the termination of the IP-CAN session along with the list of protocols used in the user traffic flows during the IP-CAN session for the user. There may be the step of the DPI device 22 classifying, the traffic sequentially or in parallel. See FIGS. 2-6. There may be the step of the DPI device 22 using a collection of rules for identifying a protocol to classify the traffic sequentially. There may be the step of the DPI device 22 searching sequentially a plurality of rule sets, each of which has a collection of rules, for a match of one of its rules with the traffic flow to classify the traffic flow with the rule which matches the traffic flow. There may be the step of the DPI device 22 reordering the rule sets based on the list of protocols. See FIGS. 2-4.

The DPI device 22 may include a plurality of processing units 44. In such an instance, there may be the step of each of the processing units 44 executing in parallel on the traffic flow an algorithm different and independent from each other to identify a protocol to classify the traffic flow. There may be the step of each of the processing units 44 producing a result on the traffic flow and, where results from the plurality of processing units 44 of the DPI device 22 are different, using the list of protocols received from the PCRF 12 to reconcile the results and identify a correct protocol for the traffic flow. See FIGS. 5 and 6.

The present invention provides for a technique of inspecting user traffic flows to determine applicable telecommunication protocols or services for each traffic flow based on the historical record of telecommunication protocols or services that have been used previously for that user or group of users. The historical information about protocols/applications/services that a user or group of users have used may be stored in PCRF 12. PCRF 12 may provide towards PCEF-DPI 14 the most probable protocols that a user or group of users are going to use in the present or in the future.

There are two main operation modes where the information retrieved from the PCEF-DPI 14 can be used.

Sequential evaluation: PCEF-DPI 14 may check whether the user traffic flow corresponds to the historical record of protocols or services before evaluating every other protocol or service; the Sequential evaluation operating, mode runs each detection method in the same processor unit.

Figure 2:
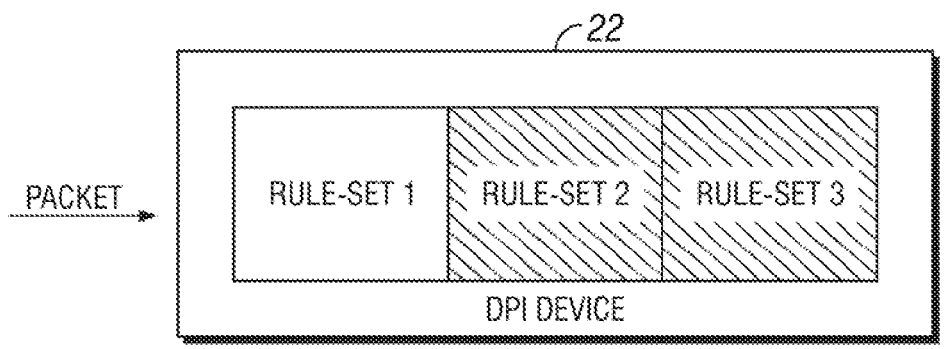
FIG. 2 shows 3 rule sets in regard to a first time of sequential evaluation.
Figure 3:
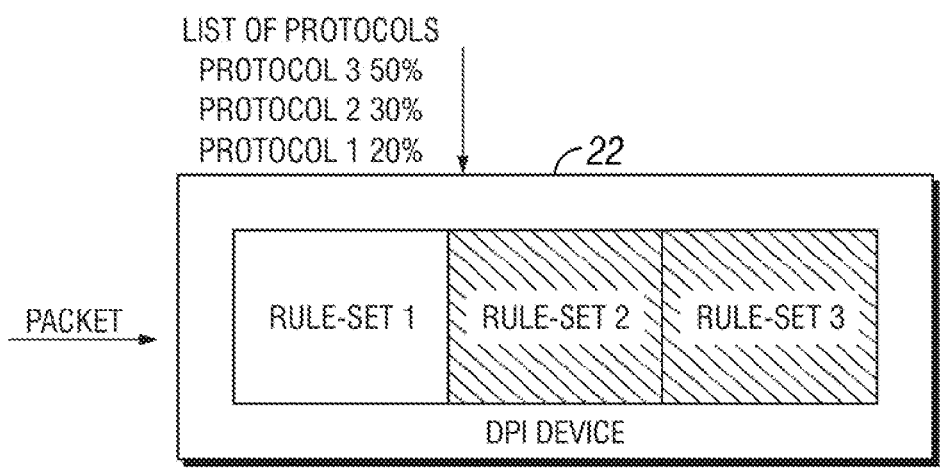
FIG. 3 shows the 3 rule sets with information regarding the list, of protocols being applied to them.
Figure 4:
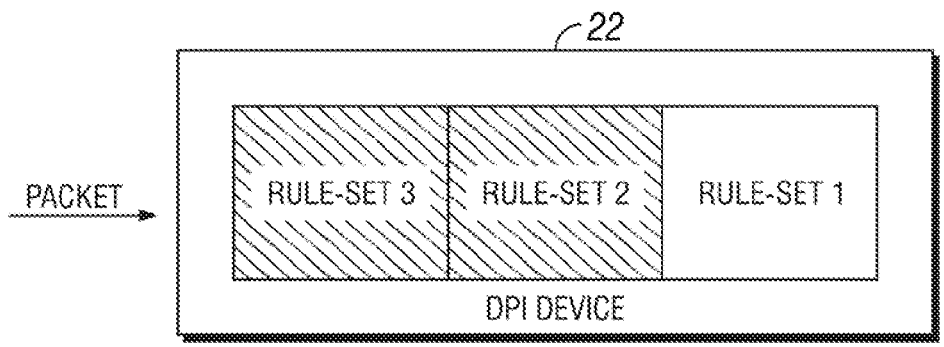
FIG. 4 shows the 3 rule sets after being reordered.

FIGS. 2-4 show an example of the sequential evaluation. The sequential evaluation is not restricted only to this case; this example is one of the possible utilization of the sequential evaluation. In this particular case, the DPI device 22 selects a method based on rules that allow the DPI device 22 to identify specific protocols. Those rules are grouped in rule sets; it means a collection of rules for identifying a protocol. The order in which those rules are analyzed is going to determine how traffic is going to be classified.

First time that this sequential evaluation is being done, rule-set 1 is analyzed before rule-set 2 and rule-set 2 before rule-set 3 as it is depicted in FIG. 2). When one of the rule-set matches in one of their rules, analysis is stopped and it means that traffic has been classified. FIG. 2 shows 3 rule sets in regard to a first time of sequential evaluation.

With this invention, rule-sets are going to be reordered according to the info provided by the list of protocols. See FIG. 3. Each protocol is analyzed by a rule-set so when the list of protocols is received, DPI knows which rules corresponds with this protocol. In this case, for clarity purposes, protocol 3 corresponds with rule-set 3, protocol 2 with rule-set 2 and protocol 1 with rule-set 1. Protocol 3 is the most used protocol and protocol 1 is the less used protocol.

FIG. 3 shows the 3 rule sets with information regarding, the list of protocols being applied to them. After receiving the list of protocols, the DPI device 22 reordered the rule-set according to the into provided. See FIG. 4. FIG. 4 shows the 3 rule sets after being reordered.

Parallel evaluation: PCEF-DPI 14 may only use those historical records of protocols or services in case of collision between the algorithms that are being evaluated in parallel and may decide what protocol or service is being used (in case of the classification of user traffic flow offering different results). The historical record is only used if there are differences in the result of the items of the parallel evaluation. The invention uses the Probable-Protocols information to conciliate the results. The conciliation is based on the probability of a protocol. Parallel evaluation operating mode takes advantage of multi processor unit computers, running each detection method in a separate processor unit.

Figure 5:
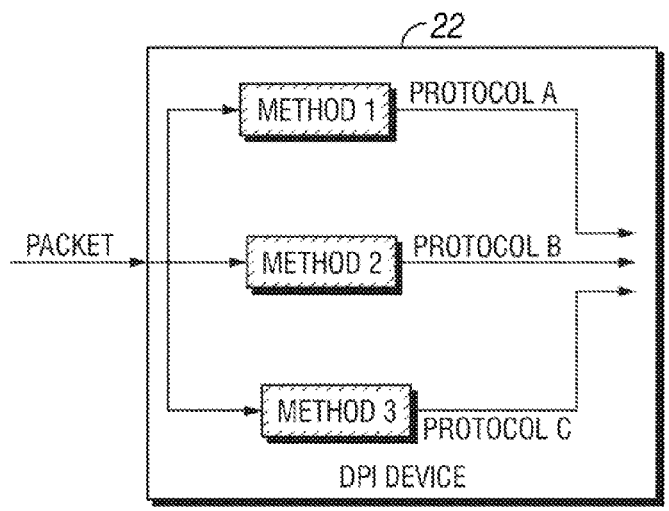
FIG. 5 shows parallel evaluation of the present invention.

In FIG. 5, there is an example of the parallel evaluation where different analysis techniques are executed. All of them are independent between them. They are represented here as method 1, method 2 and method 3. The number of techniques and the connection between them is a matter of configuration and is not a part of this invention. FIG. 5 shows parallel evaluation of the present invention.

If the operation mode is in parallel then the results might be different between different algorithms. In that case the historical record may be used to reconcile different outputs.

Figure 6:
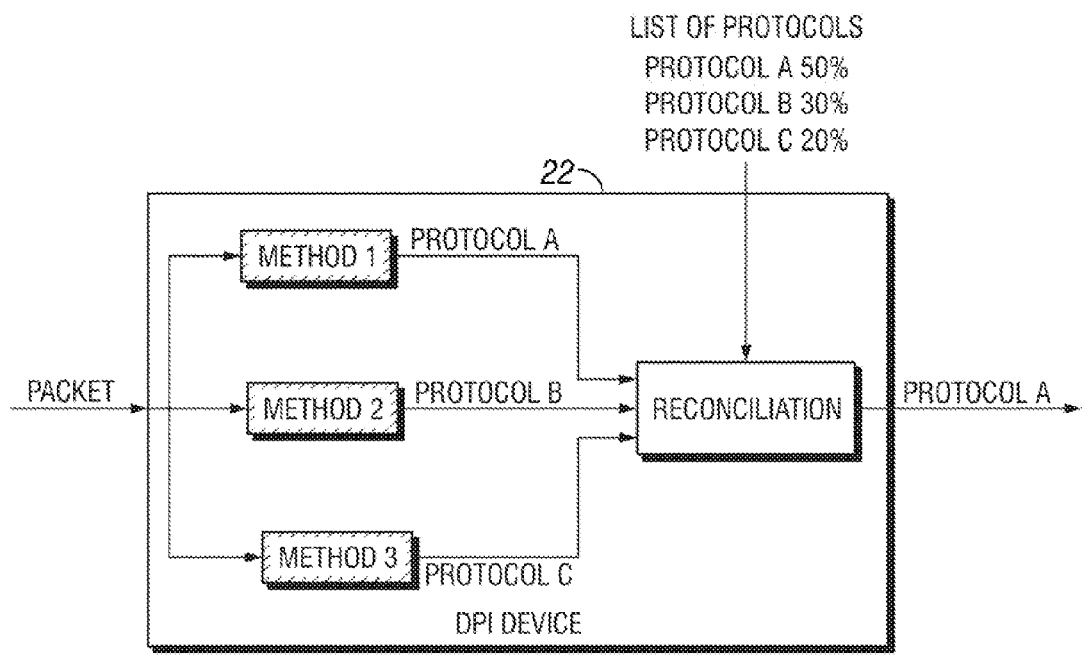
FIG. 6 shows parallel evaluation with reconciliation.

As one can see in the example, method 1 after analyzing the traffic considers that this packet belongs to protocol A, method 2 considers that is protocol B and method 3 that is protocol C. Those results are analyzed in the reconciliation part that takes into account also the most used protocols and decides which the protocol for this packet is. See FIG. 6. FIG. 6 shows parallel evaluation with reconciliation.

In case of protocols or services where PCEF-DPI 14 has to apply a statistical heuristic analysis to determine what protocol or service is being used, this method may reduce the number of incorrect detections and also provides a better capacity in terms of analysis performance, because the protocols detected on past sessions have more likelihood of detection in future sessions.

Many Internet services do not work according to protocol standards or predefined well known specification. Their detection is based on heuristic algorithms, pattern matching, user behavior and other techniques. These algorithms cannot provide a 100% accurate classification. Some mistakes are always got when the user traffic flow detection uses heuristic algorithms. The invention describes how the knowledge of the protocols and services previously used by a user could improve the detection rate and so increment the traffic throughput.

On the other hand, in Internet there are some telecommunication protocols or services that are more popular than others. The invention takes advantage of this fact.

There are four nodes involved in the invention.

Subscriber user: communication originator, which in particular might be a user, an application or a server Destination: user, application or server that is going to be called PCEF-DPI 14: embeds DPI technology to analyze the communication and determine according to his signatures which service or protocol is generating the subscriber user PCRF 12: holds all the policies per user and provisions the PCEF-DPI 14 with the rules for a given user. This method adds a new functionality: User tracking.

The following diagram describes every step in the invention method. Diameter protocol has been exemplary chosen for communication between PCEF-DPI 14 and PCRF 12, because it is likely the most usual protocol. Anyway it may also be adapted for any other protocol.

The invention uses and defines new Diameter AVPs in order to carry the Probable-Protocol information.

Probable-Protocols: Grouped AVP that holds all probable protocols

Heuristic-Probable-Protocol: Grouped AVP that holds information regarding a given protocol.

Probable-Protocol-Of: Enumerated AVP, that shall contain one of following numeric values USER(0), GROUP(1), DEPLOYMENT(2).

USER: Probable-Protocol values refer to this user. The value-units interchanged are the aggregated values of previous sessions or the result of a mobile mean of previous values. Value units are aggregated per probable-Protocol.

GROUP: Probable-Protocol values refer to this user. Aggregated value. Value units are aggregated per probable-Protocol.

DEPLOYMENT: Probable-Protocol values refer to the deployment. Aggregated value. Value units are aggregated per probable-Protocol.

GROUP and DEPLOYMENT are only meaningful in CCAs from PCRF 12 to PCEF-DPI 14.

Value-Unit: Enumerated AVP that shall contain one of following numeric values Volume(0), Occurrencest(1). Value units are aggregated per Probable-Protocol.

Percentage is only meaningful in CCAs from PCRF 12 to PCEF-DPI 14.

Volume can be present in both CCR and CCA.

Uplink: Numeric AVP that contains the "number" of uplink units defined in the Value-Unit.

Downlink: Numeric AVP that contains the "number" of uplink units defined in the Value-Unit.

Protocol-identifier: Numeric AVP. It is related to a protocol and its value is known in both PCRF 12 and PCEF-DPI 14.

Figure 7:
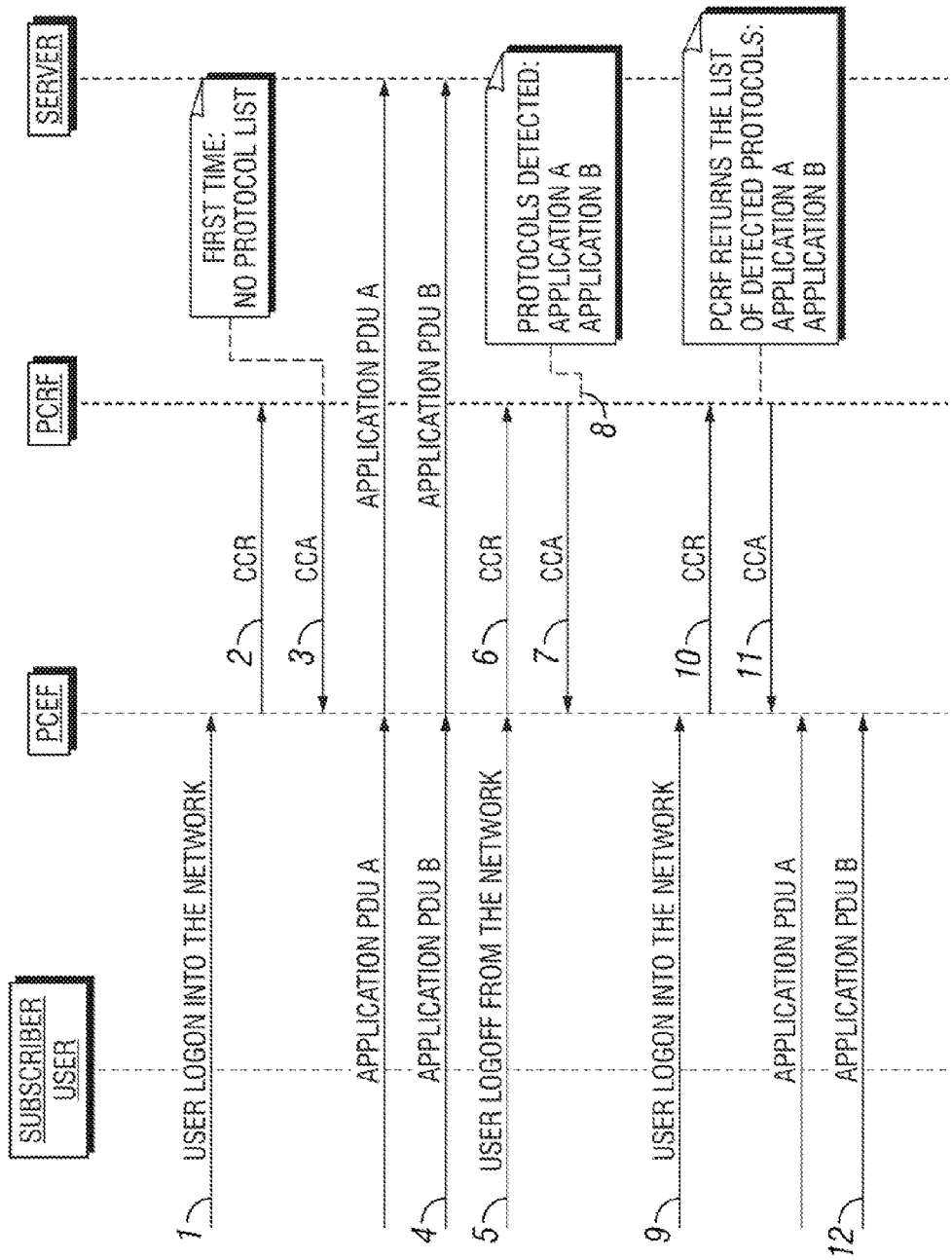
FIG. 7 shows a sequence diagram, user logon, user traffic, logoff, and logon and user traffic again.

The steps in the invention are enumerated in FIG. 7 wherein a sequence diagram illustrating user logon, logoff and logon again depicts graphically the sequence.

FIG. 7 shows a sequence diagram, user logon, logoff and logon again.

1. When the user connects to the network, establishes a first IP-CAN session at a PCEF-DPI 14 with DPI capabilities (PCEF-DPI 14),
2. Once the user session is opened in PCEF-DPI 14 opens a user session towards a PCRF 12. PCEF-DPI 14 is querying to a PCRF 12 about applicable Policy and Control rules for the first IP-CAN session with a Diameter Control Credit Request (CCR) (Policy and Charging Control CCR messages are defined in RFC 4006 section 3.1)). In this message also sends information about the service usage of the user.
3. PCRF 12 returns policy, charging rules and user tracking information. In this case, the PCRF 12 does not know any previous protocols used by the user. PCRF 12 sent towards the PCEF-DPI 14 the applicable control rules for the IP-CAN session in the Credit Control Answer (CCA) (Policy and Charging Control CCA messages are defined in RFC 4006 section 3.2).

The CCA can also carry information about the protocols used in previous sessions. This information is carried in the Probable-Protocol AVP. Those AVPs are omitted here to simplify the description.

4. PCEF-DPI 14 inspects user traffic flows for the user to determine applicable telecommunication protocols for each traffic flow. In this case, user generates two types of traffic, namely application A and application B.
5. User disconnects from the network (PDP disconnect)
6. PCEF-DPI 14 closes the diameter control session to PCRF 12. In that moment, PCEF-DPI 14 sends a CCR Termination towards the PCRF 12. In that CCR, PCEF-DPI 14 indicates to the PCRF 12 the termination of the first IP-CAN session for the user.

This is believed to be a novel point of the invention the CCR includes a Grouped AVP "Probable-Protocols" with information about the used protocols.

```
Probable-Protocols {
    Heuristic-Probable-Protocol {
        ID = 1
        Uplink = X1
        Downlink = Y1
    Heuristic-Probable-Protocol {
        Probable-Protocol-ID = 2
        Uplink = X2
        Downlink = Y2
    }
    Probable-Protocol-Of = Z
    Value-Unit = Volume(0)/Time (1)/Matches (2)
}
```

7. The PCRF 12 closes the diameter control session and sends a response back to the PCEF-DPI 14.
8. At this point, PCRF 12 knows the used service for this user. PCRF 12 may store the list of used protocols or services for this user in a database 16, This information:

Shall be stored per user.

Optionally can be stored as an aggregate per user subscription type or user profile. To be retrieved in a CCA from PCRF 12 to PCEF-DPI 14 or to make statistics.

Optionally can be stored as a global aggregate of all protocols in this PCEF-DPI 14 deployment. To be retrieved in a CCA from PCRF 12 to PCEF-DPI 14 or to make statistics.

Optionally can be stored as an aggregate per node, namely per PCEF-DPI as commented above, and group per day and time. Useful to make statistics per hour or day. This value is not intended to be sent towards the PCEF-DPI 14, but to be used in data warehousing. This value may be stored per hour/day in accordance with this invention.

The network operator could generate a statistical study about the probability to have a service/protocol in a particular day/hour range for a specific user or group user or for an average user. This database 16 could contain a historical report of what protocol or service has been used by all the users. Those, values could be aggregated by user or group of users using different methods, like total previous amount of services or a weighted mean or other probabilistic methods.

PCRF 12 knows the most popular protocol for the whole set of users (or group of users) or a specific user.

9. The user connects again to the network, establishing a second IP-CAN session for the user at the PCEF-DPI 14.
10. The PCEF-DPI 14 sends a CCR towards the PCRF 12. PCEF-DPI 14 asks to the PCRF 12 about applicable Policy and Control rules for the second IP-CAN session, PCEF-DPI 14 also queries for the Probable-Protocols.
11. The PCRF 12 sends a CCA towards the PCEF-DPI 14. This is believed to be a novel point of the invention; this message includes a list of used protocols in the user traffic flows during the first IP-CAN session in a new AVP attribute that called "Probable-Protocols".

The Probable-Protocols AVP is a new Grouped AVP composed by a new AVP Heuristic-Probable-Protocol attribute. As one can see, Probable Protocol contains a list of the heuristic probable protocol for this user as described in point 7.

```
Probable-Protocols {
    Heuristic-Probable-Protocol {
        ID = 1
        Uplink = X1
        Downlink = Y1
    Heuristic-Probable-Protocol {
        Probable-Protocol-ID = 2
        Uplink = X2
        Downlink = Y2
    }
    Probable-Protocol-Of = USER(0)
    Probable-Protocol-Of = Z
    Value-Unit = Percentage(1)
    }
```

Percentage of usage: expressing number of occurrences of a service/protocol compared with previous aggregate stored usage of the user as fraction of 100.
For example for volume values
  Total volume usage of P2P for this user is 1200 bytes
  Total volume usage of user is 6000 bytes
  Percentage of usage for P2P is 20 (1200/6000)
For example: for matching values
  Total matching usage of P2P for this user is 4 occurrences
  Total matching, usage of user is 10 occurrences
  Percentage of usage for P2P is 40 (4/10)

12. PCEF-DPI 14 inspects user traffic flows for the user to determine applicable telecommunication protocols fix each traffic flow. This is believed to be another novel point of the invention. Before digging out the user traffic flow inspection. PCEF-DPI 14 could determine first if the user is using any of the protocol or service mentioned in the list of used protocols already provided for the POUF 12 (previous step).
  At this point, the PCEF-DPI 14 can use the values provisioned in Probable-Protocols. This can be achieved by two different techniques and by combination thereof. DPI engines can use either sequential evaluation, parallel evaluation or a mixture of both. This is usually decided by configuration and hardware restrictions.
  a. Sequential evaluation: PCEF-DPI 14 may check whether the user traffic flow corresponds to these most probable protocols before evaluating every other protocol or service. In this case the PCEF-DPI 14 will do an "adaptive reordering" of the inspection patterns. Those that matched before will be placed before. The order will be decided by a weight based on the "Probable-Protocol".
    The adaptive reordering of the patterns will have the side effect of improving the performance, because those that are most probable are tried first.
  b. Parallel evaluation: PCEF-DPI 14 may only use that information in case of collision and may decide what protocol or service is being used when the classification of user traffic flow offers different results. The mostly used protocols are only used if there are differences in the result of the items of the parallel evaluation.
    This technique is best suited when there is massive hardware acceleration of the DPI algorithms and different algorithms can be applied to the same packet in parallel. If the results of the different algorithms collide, the Probable-Protocol values will be used to decide which is the most probable.

High Level Description 1

Figure 8:
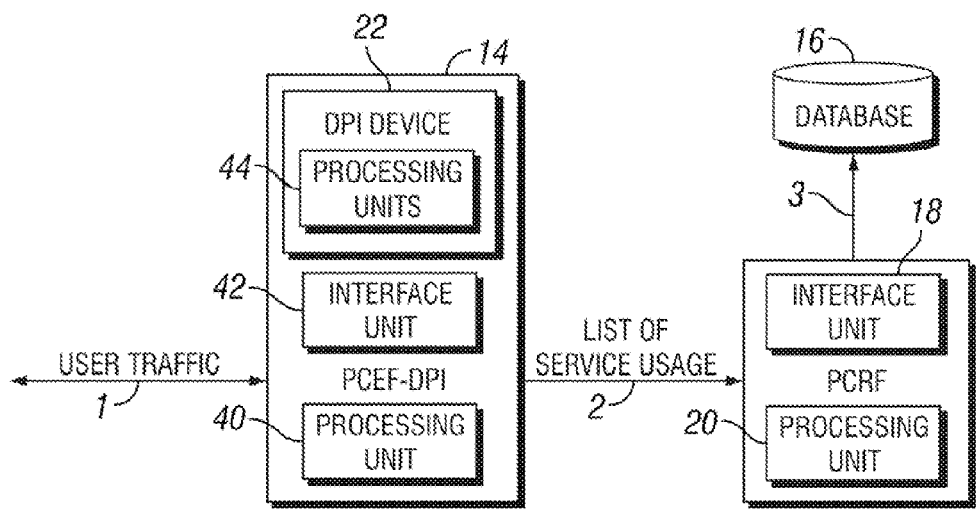
FIG. 8 shows what actions are being: done by each node once the user connects to the network.
Figure 9:
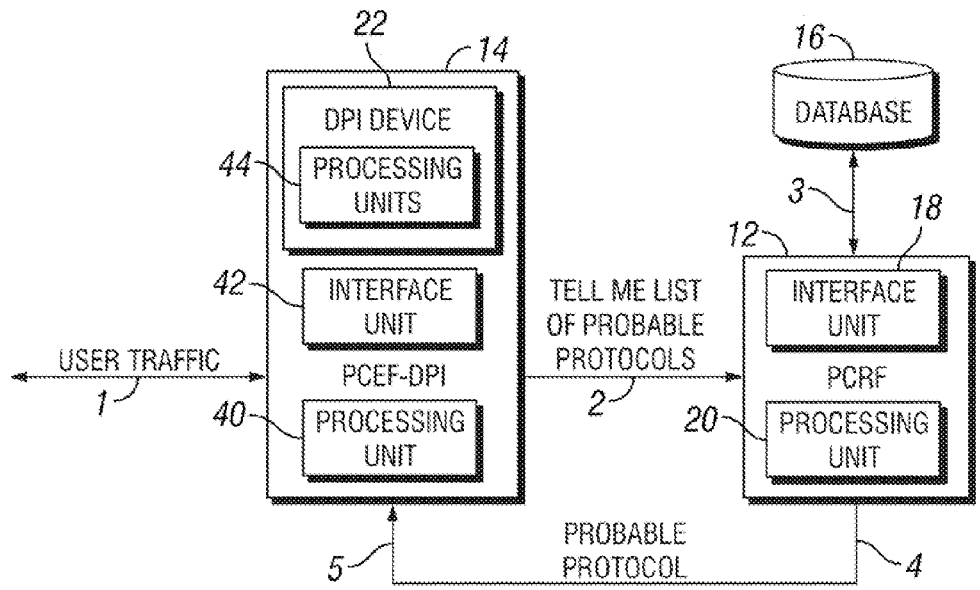
FIG. 9 shows What actions are being done by each node when the user connects to the network a second time.
Figure 10:
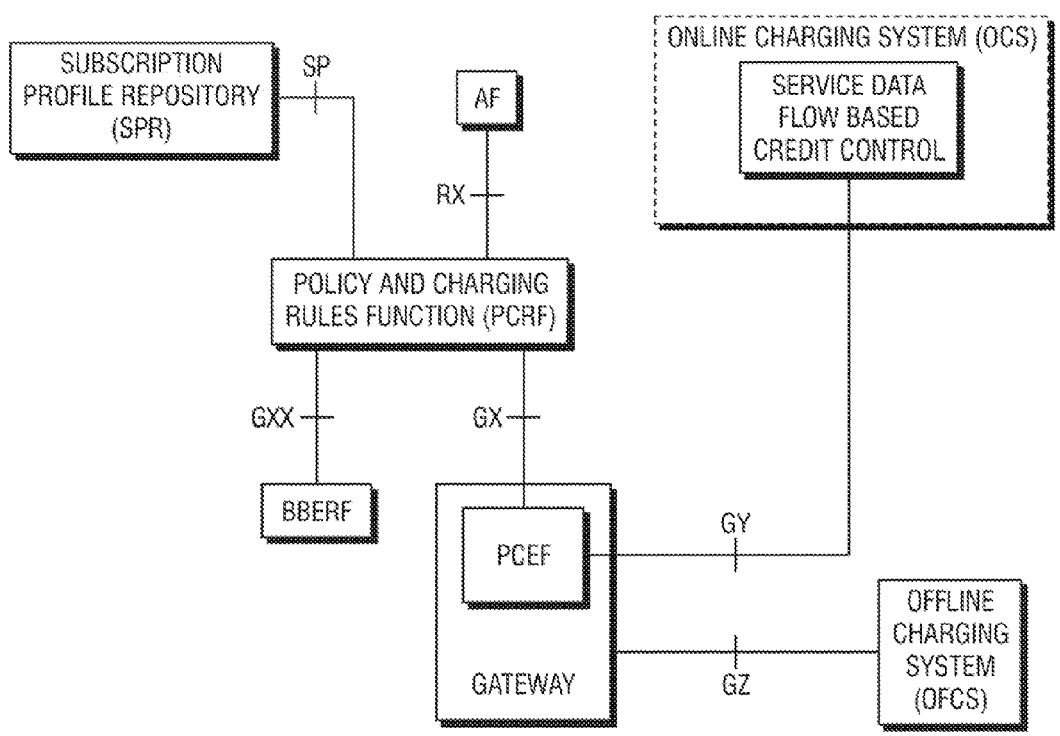
FIG. 10 shows a policy and charging control architecture of the prior art.

In order to clarify this invention, FIGS. 8 and 9 explain in a high level description what actions are being done by each node once the user connects to the network.

In point 1, the first time that this user connects to the network, PCEF-DPI 14 with DPI capabilities inspects the user traffic.

In point 2 during user session, PCEF-DPI 14 reports the usage of each protocol or service. At the end of the user session, PCRF 12 has a list of the protocols or services of the user.

In point 3, PCRF 12 stores this info in his database 16.

FIG. 8 shows what actions are being done by each node once the user connects to the network.

FIG. 9 shows what actions are being done by each node when the user connects to the network a second time.

High Level Description 2

In point 1, the user connects to the network for second time. See FIG. 9.

In point 2, PCEF-DPI 14 asks for a list of probable protocols and services.

In point 3, PCRF 12 asks to the database 16 about the probable protocols according to the day, time of the day, or other parameters that could be relevant for the operators. PCRF 12 retrieves the most probable protocols for the user.

In point 4, PCRF 12 sends those probable protocols to PCEF-DPI 14.

In point 5, PCEF-DPI 14 uses the probable protocols in either a parallel evaluation scenario or in a sequential evaluation scenario, as described before.

Obviously, in this second scenario the same actions that were described in the first one also exist. So PCEF-DPI 14 also reports service usage towards PCRF 12.

The PCEF-DPI 14 minimizes incorrect detections as follows.

As it is explained above, the detection of Internet protocols is not easy and implies several techniques as pattern detection, port association, network metrics and many others. However these techniques intrinsically generate classification errors that are impossible to reduce because of the nature of the technique applied for. These detection techniques are never free of detection mistakes. This method only pretends to reduce them.

This technique to reduce the misclassifications is based on:
  Sequential evaluation: the inspection patterns that have a high likelihood are used first. In some cases two patterns might give similar results. Then the first pattern being evaluated has more likelihood.
    When a PCEF-DPI 14 starts to analyze user traffic, the precedence of each detection algorithm is established according to the best way of recognizing all the protocols and services. In this invention PCEF-DPI 14 is going to adapt detection techniques and algorithms according to real traffic not about what is configured initially.
    The weight and order of the different elements can be also a cause of duplicates. That can be minimized using means of previous sessions or by resetting the values after a time.
  Parallel evaluation: The historical record of protocol and services is only used as a decision mechanism when the parallel evaluation does not offer a clear answer but different results.

Data Management

PCEF-DPI 14 Probable-Protocol vector management.

The PCEF-DPI 14 is in charge of update the values of the PPV (Probable Protocol Vector) which corresponds to the Probable-Protocols AVP of every user connected to the network and selected by the PCRF 12. The PPV is a list, where the elements contain the attributes defined on the Probable-Protocols parameter mentioned in the previous chapters.

These values are updated according to the protocol detection taken on the analysis stage. The analysis stage is the phase where protocol detection is being done according to the different detection methods available on the PCEF-DPI 14.

When the PCEF-DPI 14 detects a protocol on a flow, the PCEF-DPI 14 increments the values of this corresponding protocol position on the PPV (so it increments the likelihood of this protocol). Subsequently, this protocol on the next flow evaluation has a higher preference than the other protocols on the PPV.

Once the user logs off from the nets the PPV is sent to the PCRF 12, on an AVP to be stored for further use.

PCRF 12 Probable-Protocol vector management.

The PCRF 12 stores the Probable-Protocols AVP on a computer-readable recording medium. Initially the memory capacity of this data in the recording medium has to be defined according to:

The PCRF 12 hardware requirements.

Number of users that are going to be monitored

The total number of protocols/services that PCEF-DPI 14 can detect.

However, some possible memory capacity issues could appear if this method is applied. In order to solve them, some actions are described in the following points:

Increase the space of the recording medium. For example, deleting those users in the recording medium who were not updated in the last XX days.

Reduce the number of users that are going to be reported by PCEF-DPI 14. For example, those users who were not updated in the last XX days are not going to be reported from the PCEF to the PCRF.

Reduce the number of protocols/services that PCEF-DPI 14 can report to the PCRF 12

From a technical point of view, PCEF-DPI 14 may minimize the incorrect detection and increase the node throughput. PCEF-DPI 14 may adapt the mechanism detection according to information provided by PCRF 12. This information is based on the proper user traffic information generated by the PCEF-DPI 14.

Minimize incorrect detections, as it was explained in the previous point, for those techniques that work with heuristic algorithms. These algorithms cannot provide a 100% accurate classification. Some mistakes are always got when the user traffic flow detection uses heuristic algorithms. So the change of algorithm detection precedence according to real usage of traffic decreases the number of wrong detection.

Traffic throughput is increased in sequential operation modes because PCEF-DPI 14 analyzes the statistically most probable protocols before than other protocols. Statistically most probable protocols are those that had been detected in the past. Ordering of the most probable protocols is based on byte traffic amount or occurrences, because PCEF-DPI 14 analyzes the most probable protocols before than other protocols. At the PCEF-DPI 14, traffic inspection delays can be reduced if the most probable protocol list is provided to PCEF-DPI 14. PCEF-DPI 14 will start to analyze this traffic with precedence to other protocols. E.g.: PCEF-DPI 14 receives from PCRF 12 that: the most popular website is facebook. So, if PCEF-DPI 14 analyses browsing traffic then will start analyzing if URL is facebook before going deeper for other URLs.

PCEF-DPI 14 adapts the detection techniques or algorithms according to real live traffic of the users. PCEF-DPI 14 is usually configured according to a static precedence of the detection techniques/algorithms. With this invention the detection techniques/algorithms precedence changes dynamically with the feedback provided by the historical usage of the users.

P2P Protocol information can be used in data warehousing in order to know what protocols are used in the busiest hours and to detect new business opportunities. This can be used in parallel to data warehousing with Rating-Groups, Service, which can also be extracted from charging interfaces.

ABBREVIATIONS

3GPP Third Generation Partners Project
CCR Credit Control Request
CCA Credit Control Answer
CN Core Network
DPI Deep Packet Inspection
HTTP Hyper Text Transfer Protocol
IMS IP Multimedia Subsystem
IP-CAN IP Connectivity Access Network
P2P Peer to Peer
PCEF Policy Control Enforcement Function
PCRF Policy Control Resource Function
PPV Probable protocol vector
QoS Quality of Service
RAN Radio Access Network
URL Uniform Resource Locator
VoIP Voice over IP References, all of which are incorporated by reference herein.

3rd *Generation Partnership Project; Technical Specification Group Core Network and Terminals; Policy and Charging Control over Gx reference point* (Release 9) 3*GPP TS* 29.212 *V*9.2.0

3rd *Generation Partnership Project; Technical Specification Group Services and System Aspects; Policy and charging control architecture*(Release 9) 3*GPP TS* 23.203 *V*9.4.0

'*Diameter Credit-Control Application' RFC* 4006.

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A Policy and Charging Rules Function server (PCRF) of a Policy and Charging Control (PCC) Architecture for deciding control rules applicable to user traffic flows to be inspected, in accordance with applicable telecommunication protocols for each traffic flow, by a Policy and Charging Enforcement Function server with Deep Packet Inspection capabilities (PCEF-DPI) of the PCC Architecture, the PCRF comprising:

a database having a list of protocols used in the user traffic flows;

one or more processors communicatively coupled to a memory, the one or more processors operable to:

receive a query from the PCEF-DPI about applicable control rules for an IP Connectivity Access Network (IP-CAN) session established for a user at the PCEF-DPI; and send the applicable control rules for the IP-CAN session and the list of protocols to the PCEF-DPI, wherein protocols in the list of protocols were used during previous IP-CAN sessions for the user at the PCEF-DPI.

2. The PCRF of claim 1 wherein the one or more processors are further operable to determine that the list of protocols used in the user traffic flows during the previous IP-CAN sessions for the user is available.

3. The PCRF of claim 2 wherein the one or more processors are further operable to receive, from the PCEF-DPI, the list of protocols used in the user traffic flows during the IP-CAN session for the user.

4. The PCRF of claim 3 wherein the one or more processors are operable to store the list of used protocols for the user in the database either per user, or as a global aggregate of all protocols in the PCEF-DPI deployment, as an aggregate per user subscription type or user profile, or as an aggregate per node and group per day and time.

5. A Policy and Charging Enforcement Function server having Deep Packet inspection capabilities (PCEF-DPI) of a Policy and Charging Control (PCC) Architecture for inspecting User traffic flows in accordance with applicable telecommunication protocols for each traffic flow, and for installing control rules applicable to the user traffic flows, control rules received from a Policy and Charging Rules Function server (PCRF) of the PCC Architecture, the PCEF-DPI comprising:

one or more processors communicatively coupled to a memory, the one or more processors operable to:

establish an IP Connectivity Access Network (IP-CAN) session for a user, classify IP packets in each user traffic flow according to configured protocol rules, assign the IP packets to particular service sessions, send a query to the PCRF about applicable control rules for the IP-CAN session, receive, from the PCRF, the applicable control rules for the IP-CAN session along with a list of protocols, wherein protocols in the list of protocols were used during previous IP-CAN sessions for the user, and inspect user traffic flows in accordance with applicable telecommunication protocols for each traffic flow by trying first with the protocols in the list of protocols received from the PCRF.

6. The PCEF-DPI of claim 5 wherein the one or more processors are further operable to send an indication to the PCRF upon termination of each IP-CAN session for the user, the indication indicating the termination of the IP-CAN session along with the list of protocols used in the user traffic flows during the IP-CAN session for the user.

7. The PCEF-DPI of claim 6 wherein the one or more processors are further operable to classify the user traffic flows sequentially or in parallel.

8. The PCEF-DPI of claim 7 wherein the one or more processors are further operable to:

use a collection of rules for identifying a protocol to classify the traffic flow sequentially; and sequentially search a plurality of rule sets, each comprising a collection of rules, for a match of one of the collection of rules with the traffic flow to classify the traffic flow with the rule which matches the traffic flow.

9. The PCEF-DPI of claim 7 wherein each of the one or more processors is further operable to execute, in parallel on the traffic flow, an algorithm different and independent from each other to identify a protocol to classify the traffic flow.

10. The PCEF-DPI of claim 9 wherein each of the one or more processors is further operable to produce a result on the traffic flow, and when results from the one or more processors are different, the list of protocols received from the PCRF is used to reconcile the results and identify a correct protocol for the traffic flow.

11. A method of a Policy and Charging Rules Function server (PCRF) of a Policy and Charging Control (PCC) Architecture for deciding control rules applicable to user traffic flows, to be inspected in accordance with applicable telecommunication protocols for each traffic flow, by a Policy and Charging Enforcement Function server with Deep Packet Inspection capabilities (PCEF-DPI) of the PCC Architecture, the method comprising:

receiving a query, at the PCRF and from the PCEF-DPI, about applicable control rules for an IP Connectivity Access Network (IP-CAN) session established for a user at the PCEF-DPI; and sending, from the PCRF and to the PCEF-DPI, the applicable control rules for the IP-CAN session and a list of protocols used in the user traffic flows, which have been stored in a database, wherein the list of protocols includes those protocols used during previous IP-CAN sessions for the user at the PCEF-DPI.

12. The method of claim 11, further comprising determining, by the PCRF, that the list of protocols used in the user traffic flows during the previous IP-CAN sessions for the user is available.

13. The method of claim 12, further comprising receiving, at the PCRF and from the PCEF-DPI, the list of protocols used in the user traffic flows during the IP-CAN session for the user.

14. A method of a Policy and Charging Enforcement Function server having Deep Packet Inspection capabilities (PCEF-DPI) of a Policy and Charging Control (PCC) Architecture for inspecting user traffic flows in accordance with applicable telecommunication protocols for each traffic flow, and for installing control rules applicable to the user traffic flows, control rules received from a Policy and Charging Rules Function server (PCRF) of the PCC Architecture, the method comprises:

establishing, with the PCRF, an IP Connectivity Access Network (IP-CAN) session for a user;

sending, by the PCEF-DPI and to the PCRF, a query about applicable control rules for the IP-CAN session;

receiving, at the PCEF-DPI and from the PCRF, the applicable control rules for the IP-CAN session along with a list of protocols, wherein the list of protocols includes those protocols used during previous IP-CAN sessions for the user at the PCEF-DPI; and inspecting, by the PCEF-DPI, user traffic flows in accordance with applicable telecommunication protocols for each traffic flow by trying first with those protocols in the list of protocols received from the PCRF.

15. The method of claim 14, further comprising sending an indication to the PCRF upon termination of each IP-CAN session for the user, the indication indicating the termination of the IP-CAN session along with the list of protocols used in the user traffic flows during the IP-CAN session for the user.

16. The method of claim 15, further comprising classifying, by the PCEF-DPI, the user traffic flows sequentially or in parallel.

17. The method of claim 16, further comprising using, by the PCEF-DPI, a collection of rules for identifying a protocol to classify the user traffic flows sequentially.

18. The method of claim 17, further comprising searching sequentially, by the PCEF-DPI, a plurality of rule sets, each comprising a collection of rules, for a match of one of the collection of rules with the traffic flow to classify the traffic flow with the rule which matches the traffic flow.

19. The method of claim 17, wherein the PCEF-DPI comprises one or more processors communicatively coupled to a memory, each of the one or more processors:
- executing, in parallel on the traffic flow, an algorithm different and independent from each other to identify a protocol to classify the traffic flow,
- produce a result on the traffic flow, and
- using the list of protocols received from the PCR to reconcile the results and identify a correct protocol for the traffic flow when the results from the one or more processors are different.

* * * * *

UNITED STATES PATENT AND TRADEMARK OFFICE
CERTIFICATE OF CORRECTION

PATENT NO. : 9,294,380 B2
APPLICATION NO. : 13/809242
DATED : March 22, 2016
INVENTOR(S) : Rubio Vidales et al.

It is certified that error appears in the above-identified patent and that said Letters Patent is hereby corrected as shown below:

On the Title Page, in Item (57), under "ABSTRACT", in Column 2, Lines 8-9, delete "tialYtc flow s The" and insert -- traffic flows. The --, therefor.

On the Title Page, in Item (57), under "ABSTRACT", in Column 2, Line 12, delete "DPI The" and insert -- DPI. The --, therefor.

In Column 1, Line 55, delete "ties" and insert -- lies --, therefor.

In Column 1, Line 60, delete "source," and insert -- (source, --, therefor.

In Column 3, Line 11, delete "for to" and insert -- for a --, therefor.

In Column 3, Line 18, delete "trying," and insert -- trying --, therefor.

In Column 3, Line 50, delete "of an" and insert -- of art --, therefor.

In Column 4, Line 23, delete "flues" and insert -- rules --, therefor.

In Column 4, Line 32, delete "first." and insert -- first --, therefor.

In Column 4, Line 45, delete "shows" and insert -- shows the --, therefor.

In Column 4, Line 48, delete "list," and insert -- list --, therefor.

In Column 4, Line 50, delete "shows" and insert -- shows a --, therefor.

In Column 4, Line 51, delete "shows" and insert -- shows a --, therefor.

In Column 4, Line 54, delete "being:" and insert -- being --, therefor.

Signed and Sealed this
Fifth Day of July, 2016

Michelle K. Lee
*Director of the United States Patent and Trademark Office*

In Column 4, Line 56, delete "What" and insert -- what --, therefor.

In Column 5, Line 5, delete "inspection" and insert -- Inspection --, therefor.

In Column 5, Line 6, delete "PCRF P" and insert -- PCRF 12 --, therefor.

In Column 5, Line 6, delete "list," and insert -- list --, therefor.

In Column 5, Line 19, delete "traffic," and insert -- traffic --, therefor.

In Column 5, Line 41, delete "accounting," and insert -- accounting --, therefor.

In Column 5, Line 46, delete "installing," and insert -- installing --, therefor.

In Column 6, Line 16, delete "and" and insert -- and, --, therefor.

In Column 6, Line 16, delete "processing," and insert -- processing --, therefor.

In Column 6, Line 45, delete "Control" and insert -- control --, therefor.

In Column 6, Line 67, delete "classifying," and insert -- classifying --, therefor.

In Column 7, Line 29, delete "PCRF" and insert -- a PCRF --, therefor.

In Column 7, Line 37, delete "operating," and insert -- operating --, therefor.

In Column 7, Line 51, delete "as it is" and insert -- (as it is --, therefor.

In Column 7, Line 63, delete "regarding," and insert -- regarding --, therefor.

In Column 7, Line 66, delete "into" and insert -- info --, therefor.

In Column 9, Line 4, delete "protocols" and insert -- protocols. --, therefor.

In Column 9, Line 25, delete "Occurrencest(1)." and insert -- Occurrences(1). --, therefor.

In Column 9, Line 44, delete "14)," and insert -- 14). --, therefor.

In Column 10, Line 1, delete "disconnect)" and insert -- disconnect). --, therefor.

In Column 10, Line 28, delete "16," and insert -- 16. --, therefor.

In Column 10, Line 50, delete "Those," and insert -- Those --, therefor.

In Column 11, Line 24, delete "example" and insert -- example: --, therefor.

CERTIFICATE OF CORRECTION (continued)
U.S. Pat. No. 9,294,380 B2

In Column 11, Line 28, delete "example:" and insert -- example; --, therefor.

In Column 11, Line 31, delete "matching," and insert -- matching --, therefor.

In Column 11, Line 34, delete "fix" and insert -- for --, therefor.

In Column 11, Line 37, delete "inspection." and insert -- inspection, --, therefor.

In Column 11, Line 40, delete "POUF" and insert -- PCRF --, therefor.

In Column 13, Line 7, delete "list," and insert -- list --, therefor.

In Column 13, Line 21, delete "nets" and insert -- network --, therefor.

In Column 13, Line 29, delete "monitored" and insert -- monitored. --, therefor.

In Column 13, Line 43, delete "12" and insert -- 12. --, therefor.

In Column 14, Line 3, delete "that:" and insert -- that --, therefor.

In Column 14, Line 44, delete "V9.2.0" and insert -- V9.2.0. --, therefor.